Jan. 12, 1954   D. W. OSMUN   2,665,773
LINE LUBRICATOR
Filed April 13, 1950   2 Sheets-Sheet 2
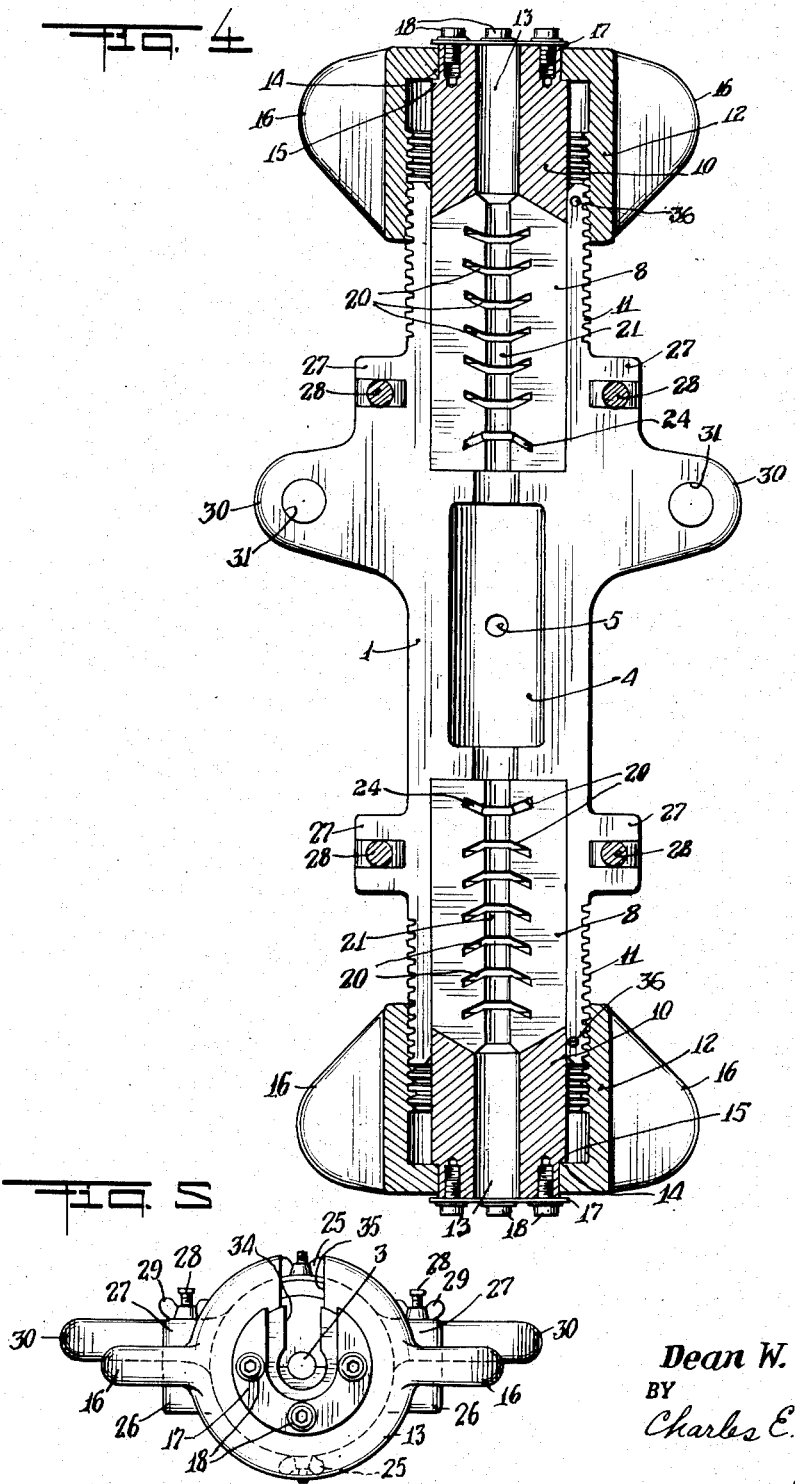
INVENTOR.
Dean W. Osmun
BY
Charles E. Lightfoot
ATTORNEY Patented Jan. 12, 1954

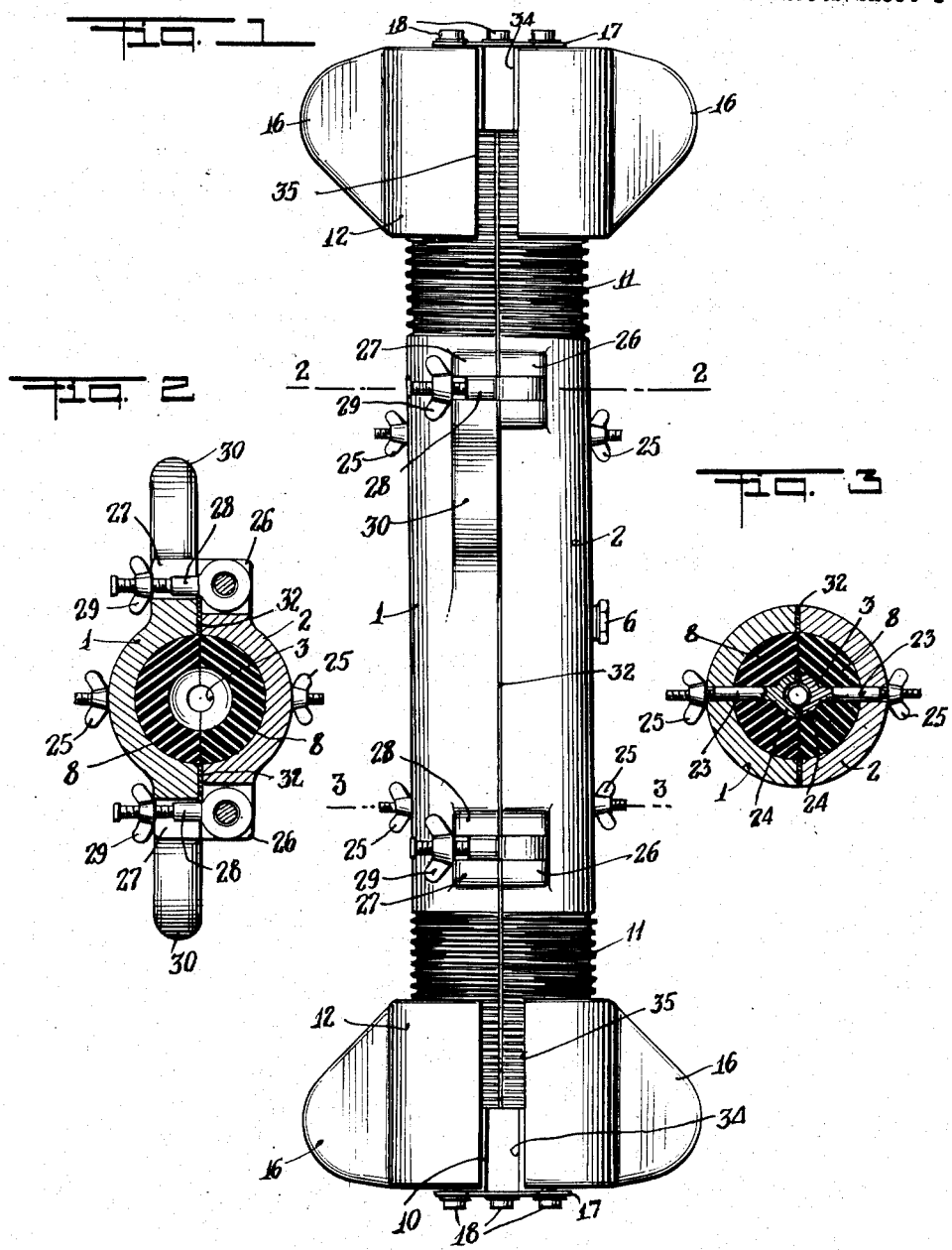

2,665,773

UNITED STATES PATENT OFFICE 2,665,773

LINE LUBRICATOR

Dean W. Osmun, Houston, Tex.

Application April 13, 1950, Serial No. 155,668

4 Claims. (Cl. 184—15)

This invention relates to a line lubricator, and more particularly to a lubricating device adapted for application to cables or the like for applying lubricant to the same.

The invention has particular application in connection with oil field equipment or similar apparatus, wherein lines such as cables are employed, which are often exposed over relatively long periods of time to adverse conditions, such as being submerged in well fluids of various degrees of acidity, alkalinity or salt content, capable of causing corrosion to a degree sufficient to shorten substantially the useful life of the line. Such lines are frequently used under conditions were they must remain for long periods in contact with water or well fluids, or wound in a wet condition on reels forming part of the well equipment, which results in deterioration of the line rendering it unsafe for normal loads, or damaged to such an extent as to require replacement.

It is an object of this invention to provide line lubricator means whereby the above undesirable conditions may be overcome, and the line protected against damage of the kind referred to for an indefinite period of time.

A further object of the invention is the provision of a line lubricator which is adapted to be conveniently applied to the line while the same is in use, and which is effective continuously during operation of the line to maintain the same in a thoroughly lubricated condition, thus substantially prolonging the useful life of the line.

Another object of the invention is to provide a line lubricator device which may be used with a line extending into a well, and adapted to effectively apply lubricant to the line as it moves in and out of the well, to counteract the effect of water or other fluid on the line and protect the same from rust or corrosion.

A still further object is the provision of a line lubricator of simple design and rugged construction, capable of withstanding the hard usage and conditions of exposure to which such a device is likely to be subjected.

Other objects and advantages will be apparent from the following description constituting a specification of the invention when taken in conjunction with the annexed drawings, wherein—

Figure 1 is a side elevational view of the invention in assembled condition;

Figure 2 is a cross-sectional view, taken along the line 2—2 of Figure 1, looking in the direction indicated by the arrows;

Figure 3 is a cross-sectional view taken along the line 3—3 of Figure 1, looking in the direction indicated by the arrows;

Figure 4 is a plan view, partly in section, showing one member of the invention with the other member removed; and Figure 5 is an end view of the invention, looking at the lower end of the device as seen in Figure 1.

The invention, briefly stated, comprises two separable members adapted to be assembled about the line so that the line passes longitudinally through the lubricator, there being packing elements at each end of the device and a centrally disposed lubricant receiving chamber therein.

Referring now to the drawings in greater detail, the numeral 1 indicates one of the separable members and 2 indicates the other member. The members are shaped to fit together, as seen in Figure 1, and when assembled provide a continuous passage 3 from end to end of the lubricator, through which a line may pass.

Each of the separable members has a recess therein, as seen at 4 in Figure 4, such that when the members are assembled a chamber is formed through which the line passes. An opening 5 is provided in the chamber which is fitted with a plug 6 for the introduction of lubricant under pressure into the chamber.

The separable members also have recesses therein at their end portions for the reception of packing members 8 of resilient material, which are adapted to be compressed by bushing members 10, having holes 12 therethrough. The numbers 1 and 2 are provided with external threads 11 at their end portions, upon which cap members 12 are threaded, and the cap members are formed with inturned portions 14, engaging shouldered portions 15 on the bushing members, for moving the latter inwardly against the packing members when the caps are screwed on the device. Wing extensions 16 are formed on the caps, whereby they may be readily rotated on the device. A plate 17 of generally U-shape is secured to the end of each of the bushing members 10 by suitable means such as Allen screws 18, and these plates overhang the caps 12 to prevent their removal from the lubricator.

Each of the resilient packing members is preferably formed with semi-circular lubricant retaining slots 20 therein forming a plurality of wiping portions and a groove 21, so that when the members 1 and 2 are assembled a cylindrical opening extends therethrough with the grooves around the opening. The packing members may be retained in the recessed end portions of the members 1 and 2 by bolts 23 having flattened, semi-annular heads 24 which fit into the slots 20 beneath the groove 21, and the bolts extend through the resilient material and through the members to receive thereon the wing nuts 25, whereby the bolts are tightened in place.

Slotted lugs 26 are formed on the member 2, and similar lugs 27 are provided on the member 1. Bolts 28 are pivoted in the lugs 26 and are swingable to enter the slots in lugs 27, wherein they may be tightened by the wing nuts 29.

Extensions 30 are formed on the member 1, which have perforations 31 to receive fastening means for securing the lubricator to any convenient support.

Suitable packing material 32 may be disposed between the meeting surfaces of the members 1 and 2 to prevent the escape of lubricant.

The bushing members 10 and the caps 12 are formed with slots 34 and 35, respectively, whereby these parts can be placed on a line passing through the lubricator and rotated thereon to screw the caps into place.

The member 1 also has raised protrusions 36 thereon which fit into corresponding depressions in the member 2 to assure coincidence of the surfaces of the members when assembled.

In applying the lubricator to a line, the screws 18 are removed and the plates 17 taken off the ends of the device, after which the caps 12 are screwed off and the bushings 10 removed. The wing nuts 29 are loosened, and bolts 28 swing out of lugs 27 so that the members 1 and 2 can be separated. The two members 1 and 2 are then positioned about the line and held in assembled relation thereon by swinging bolts 28 into slotted lugs 27 and tightening the wing nuts 29. The bushings 10 are inserted by placing slots 34 over the line, and caps 12 are likewise positioned with the line in the slots 35, after which the caps can be screwed on the assembled device. Plates 17 are positioned on the ends of the bushings and screws 18 inserted.

The grooves 21 in resilient packing members 8 are preferably somewhat smaller in diameter than the line so that the line fits snugly in the lubricator. Lubricant is then forced into the chamber 4 and will be retained therein by the packing members. The caps 12 may turn freely on the bushings 10, and because of the engagement between the inturned portions 14 with the shouldered portion 15 of the bushings 10, the bushings can be forced into compressing engagement with the packing members 8, tightening the same about the line to prevent the escape of lubricant from the chamber 4.

It will readily be seen that as the line is pulled through the lubricator in either direction lubricant in the chamber 4 will be coated thereon and excess lubricant will then be wiped off as the line passes through the packing members, and will be retained in the lubricant chamber. Moreover, a line which is being withdrawn from a well, for example, and which may be wet with fluid from the well, will be wiped in entering the lubricator and lubricated in passing therethrough, thus conditioning the line against rust and corrosion. A line which is being lowered into a well will likewise be lubricated before entering the well and protected against corrosive effect of alkali, acid or other deleterious substance with which it may come in contact.

The invention thus provides a simple and convenient means for applying lubricant to a line, and one which effectively performs its function without special attention over a long period of time.

The invention is disclosed herein in connection with a particular embodiment of the same, but it will be understood that this is intended by way of illustration only, and numerous changes in the construction and arrangement of the various parts can be made, without departing from the spirit of the invention or the scope of the appended claims.

Having thus clearly shown and described the invention, what is claimed as new and desired to secure by Letters Patent is—

1. A line lubricating device comprising separable sections adapted to be closed about a line and forming when closed a body having an axial, line-receiving passageway and a lubricant chamber mediate the ends of the passageway, resilient packing members in the sections surrounding said line beyond each end of said chamber, each of said members having a plurality of wiping portions adapted to engage said line in lubricant sealing relation, means carried by the sections and engageable with said packing members between said wiping portions for retaining said members in the sections and adjustable means on said body for compressing said packing members to tighten said portions on said line, each of said adjustable means having an axial, line-receiving opening therethrough and a slot through which the line may enter the opening.

2. A line lubricating device comprising separable sections adapted to be closed about a line and forming when closed a body having an axial, line-receiving passageway therethrough and a lubricant chamber mediate the ends of said sections, resilient packing members in the passageway surrounding the line beyond each end of said chamber, each of said members having spaced wiping portions adapted to engage said line in lubricant sealing relation and lubricant retaining slots between said wiping portions, means carried by the sections and engageable with the members in said slots to retain said members in the sections and adjustable means on said body for compressing said packing members to tighten said portions about said line, each of said adjustable means having an axial opening therethrough and a slot through which the line may enter said opening.

3. A line lubricating device comprising separable sections adapted to be closed about a line and forming when closed a body having an axial, line-receiving passageway therethrough and a lubricant chamber mediate the ends of said passageway, resilient packing members in the passageway in lubricant sealing engagement with the line beyond each end of said chamber, caps threadably carried on the ends of said body, bushings extending into the passageway into engagement with said packing members and cooperable with the caps to tighten the packing members about said line, retainer means holding said caps and bushings in rotatable engagement, each of said caps, bushings and retainer means having an axial, line-receiving opening therethrough and a slot through which the line may enter said opening.

4. A line lubricating device comprising separable sections adapted to be closed about a line and forming when closed a body having an axial, line-receiving passageway therethrough and a lubricant chamber mediate the ends of said sections, resilient packing members in the passageway surrounding said line beyond each end of said chamber, each of said members having spaced wiping portions adapted to engage said line in lubricant sealing relation, means carried by the sections and having portions disposed radially outwardly of the passageway and engageable with said members between said wiping portions to retain the members in the sections, caps threadably carried on the ends of said body, bushings in the passageway in engagement with said members and extending beyond the ends of the body for cooperative engagement with the caps, each of said caps and bushings having an axial, line-receiving opening therethrough and a slot through which the line may enter said opening.

DEAN W. OSMUN.

References Cited in the file of this patent

UNITED STATES PATENTS

| Number | Name | Date |
| --- | --- | --- |
| 1,081,443 | Godfrey | Dec. 16, 1913 |
| 1,471,583 | Anderson | Oct. 23, 1923 |
| 1,509,906 | Sawtelle | Sept. 30, 1924 |
| 1,875,936 | Saunders | Sept. 6, 1932 |
| 2,097,016 | Bowen | Oct. 26, 1937 |

FOREIGN PATENTS

| Number | Country | Date |
| --- | --- | --- |
| 26,778 | Great Britain | Dec. 4, 1907 |
| 612,180 | Great Britain | Nov. 9, 1948 |
| 714,911 | France | Sept. 14, 1931 |